United States Patent
Robinson et al.

(10) Patent No.: US 9,594,531 B2
(45) Date of Patent: Mar. 14, 2017

(54) SYSTEMS AND METHODS FOR FACILITATING MIMIC DRIVEN OPERATIONS IN DIGITAL IMAGING DEVICES

(71) Applicant: Xerox Corporation, Norwalk, CT (US)

(72) Inventors: David C Robinson, Penfield, NY (US); Nagarajan Narasimhan, Torrance, CA (US); Raju Seetharam, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 303 days.

(21) Appl. No.: 14/522,644

(22) Filed: Oct. 24, 2014

(65) Prior Publication Data

US 2016/0117138 A1    Apr. 28, 2016

(51) Int. Cl.

| G06F 3/048 | (2013.01) |
|---|---|
| G06F 3/12 | (2006.01) |
| G06F 3/0484 | (2013.01) |
| G06K 15/00 | (2006.01) |
| H04N 1/00 | (2006.01) |

(52) U.S. Cl.
CPC ........ *G06F 3/1257* (2013.01); *G06F 3/04842* (2013.01); *G06F 3/04847* (2013.01); *G06F 3/1204* (2013.01); *G06F 3/1206* (2013.01); *G06K 15/005* (2013.01); *H04N 1/0044* (2013.01); *H04N 1/0097* (2013.01); *H04N 1/00405* (2013.01); *H04N 1/00411* (2013.01); *H04N 1/00416* (2013.01); *H04N 1/00437* (2013.01); *H04N 1/00464* (2013.01); *H04N 1/00466* (2013.01); *H04N 1/00474* (2013.01); *H04N 1/00477* (2013.01); *H04N 1/00482* (2013.01)

(58) Field of Classification Search
CPC .......................... G06F 3/1257; G06F 3/04847
USPC ......................................................... 715/763
See application file for complete search history.

(56) References Cited

U.S. PATENT DOCUMENTS

| 8,843,585 B1 * | 9/2014 | Normann ........... H04N 21/8543 709/217 |
|---|---|---|
| 2002/0029341 A1 * | 3/2002 | Juels ....................... G06F 21/36 713/184 |
| 2009/0248996 A1 * | 10/2009 | Mandyam ............. G06F 9/4443 711/154 |

(Continued)

*Primary Examiner* — William Titcomb
(74) *Attorney, Agent, or Firm* — Jones Robb, PLLC

(57) ABSTRACT

Systems and methods for facilitating processing of at least one value of attribute(s) on a device such as an imaging device or a printing device. A method includes providing a GUI including graphical format object(s) corresponding to a number of attributes on a display device associated with the device. The method further includes allowing a user to manipulate the graphical format object(s) by dragging the graphical format object(s) of the GUI. The method also includes creating a graphical representation for the attributes based on the manipulation of the graphical format objects by the user. The method also includes defining one or more values of the attributes based on the graphical representation. Further, the method includes saving the graphical representation and the values of the attributes. One or more operations can be executed on the device based on the saved graphical representation and the values of the attributes.

38 Claims, 7 Drawing Sheets

(56) References Cited

U.S. PATENT DOCUMENTS

2011/0298804 A1* 12/2011 Hao .................... G06T 11/206
                                                       345/440
2012/0005045 A1*  1/2012 Baker ................ G06Q 30/0643
                                                       705/27.2

* cited by examiner

SYSTEMS AND METHODS FOR FACILITATING MIMIC DRIVEN OPERATIONS IN DIGITAL IMAGING DEVICES

TECHNICAL FIELD

The presently disclosed embodiments relate to digital electronic devices, and more particularly to methods and systems for facilitating a user to process at least one value of a plurality of attributes on a device, such as a printing device, an imaging device, etc.

BACKGROUND

Digital electronic devices such as digital printing devices, digital imaging devices, etc., are equipped with features and functionalities to satisfy a variety of users ranging from a novice user to an expert user. Generally, these features are selected or modified based on selection of an item from a menu on a graphical user interface (GUI) or by entering values for the individual features.

The imaging devices or printing devices often have a wide variety of operating attributes that can be set by the users of these devices. Current imposition or finishing application on various imaging/printing devices enables users to define a layout and/or finishing operations via entering or selection of attributes with associated values. The user is provided with an updated mimic view of how the final output will look as the attributes and values are selected. The process can be time consuming, as the user has to adjust the settings for individual attributes to yield a mimic display that meets user's expectations. Most of the time user is unaware of the context of some attributes and may not be able to select the value properly.

In light of above discussion, there exists need for techniques for facilitating mimic driven operations in digital imaging systems or devices.

SUMMARY

An embodiment of the present disclosure provides a method for facilitating processing of at least one value of a number of attributes on a device. The method includes providing a graphical user interface (GUI) by a device manager on a display device associated with the device. The GUI includes a number of graphical format objects corresponding to each of the attributes. The method also includes allowing a user to manipulate the graphical format objects by at least one of selecting and moving one or more of the plurality of graphical format objects of the GUI. The method also includes creating a graphical representation for the attributes based on the manipulation of the graphical format objects by the user. The method further includes defining one or more values of the attributes based on the graphical representation. The method also includes saving the graphical representation and the one or more values of the attributes. The one or more operations are executed on the device based on the saved graphical representation and the one or more values of the attributes.

Another embodiment of the present disclosure provides a system for facilitating a user to process at least one value of a number of attributes on a device. The system also includes a display manager configured to display a graphical user interface including a number of graphical format objects on a display device associated with the device. The graphical format objects are corresponding to each of the attributes. The GUI allows a user to manipulate the graphical format objects. The system also includes an attribute processing manager configured to: create a graphical representation for the attributes based on the manipulation of the graphical format objects by the user, define one or more values of the attributes based on the graphical representation, and save the graphical representation and the one or more values of the plurality of attributes. The system further includes an execution manager configured to execute one or more operations on the device based on the saved graphical representation and the one or more values of the attributes.

A further embodiment of the present disclosure provides a method for facilitating a user to process at least one value of a number of attributes on a display device of an imaging device. The method includes providing a graphical user interface (GUI) including a number of graphical format objects on a touch sensitive display device by a display manager. The graphical format objects are corresponding to each of the attributes. The method also includes allowing a user or computer device to manipulate the graphical format objects by dragging one or more of the graphical format objects of the GUI displayed by the display manager. The method also includes creating a graphical representation for the attributes based on the graphical format objects by the user. The method also includes defining one or more values for the attributes based on the graphical representation. The method further includes saving the graphical representation and the one or more values of the attributes. Further, one or more operations may be executed on a job based on the created and saved graphical representation and the one or more values of the attributes. In some embodiments, the one or more operations include at least one of one or more imposition operations and one or more finishing operations.

A yet another embodiment of the present disclosure provides a system for facilitating a user to process at least one value of a number of attributes on a digital imaging device. The system includes a touch sensitive display device including a display manager configured to display a graphical user (GUI) including a number of graphical format objects. The graphical format objects are corresponding to each of the attributes. The GUI allows a user to manipulate the graphical format objects by dragging one or more of the graphical format objects. The system also includes an attribute processing manager configured to create a graphical representation for the attributes based on the manipulation of the plurality of graphical format objects by the user. The attribute processing manager is also configured to define one or more values for the attributes based on the graphical representation. The attribute processing manager is also configured to save the graphical representation and the one or more values of the attributes. The system also includes an execution manager configured to execute one or more operations on a job based on the saved graphical representation and the one or more values of the attributes. Further, the one or more operations include at least one of one or more imposition operations and one or more finishing operations. The execution manager is also configured to export the saved graphical representation for use with another device capable of recognizing the saved graphical representation. The execution manager is further configured to execute the exported graphical representation on a separate, additional device.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1A:
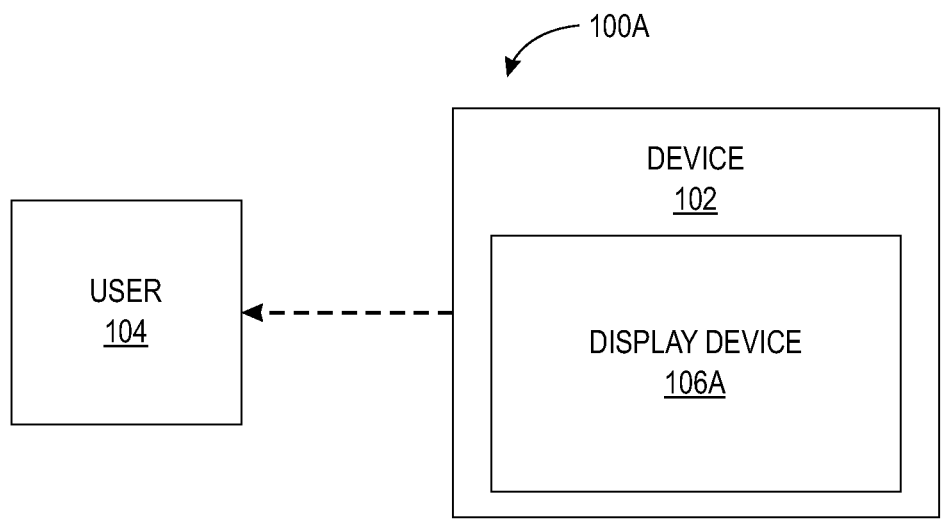
FIG. 1A is a schematic illustrating an exemplary system including a device in accordance with an embodiment of the present disclosure.

The following detailed description is made with reference to the figures. Preferred embodiments are described to illustrate the disclosure, not to limit its scope, which is defined by the claims. Those of ordinary skill in the art will recognize a number of equivalent variations in the description that follows.

It will be readily understood that the components of the disclosed embodiments, as generally described and illustrated in the Figures herein, may be arranged and designed in a wide variety of different configurations. Thus, the following detailed description of the embodiments of the apparatus, system, and method of the disclosed subject matter, as presented in the Figures, is not intended to limit the scope of the disclosed subject matter, as claimed, but is merely representative of selected embodiments of the disclosed subject matter.

The functional units described in this specification have been labeled as managers and directors. A manager and/or director may be implemented in programmable hardware devices such as processors, digital signal processors, central processing units, field programmable gate arrays, programmable array logic, programmable logic devices, cloud processing systems, or the like. The manager and/or director may also be implemented in software for execution by various types of processors. An identified manager and/or director of executable code may, for instance, comprises one or more physical or logical blocks of computer instructions, which may, for instance, be organized as an object, procedure, function, or other construct. Nevertheless, the executables of an identified manager and/or director need not be physically located together, but may comprise disparate instructions stored in different locations which, when joined logically together, comprise the manager and/or director and achieve the stated purpose of the manager and/or director.

Indeed, a manager and/or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

DEFINITIONS

In this disclosure, the term "device" can include a digital electronic device having a display unit for displaying at least one graphical user interface to a user. The device can include, but is not limited to, a printing device, an imaging device, photocopier, a xerographic photocopier, a paper handler, a document finisher, a scanner, a printer, a fax machine, or any appropriate device, device driver, client device, or system for a graphical user interface for an imaging or printing device.

As used herein, a "graphical user interface" (GUI) can include an interface on the device enabling a user to interact with the device. The GUI may include one or more graphical format objects. The term "graphical format object" can refer to icons or images corresponding to at least one attribute or property of the device. Further, the term "attribute" can include a property defining at least one feature of the device.

As used herein the term "imposition operation" can include an operation that may be performed on a job, such as a print job, of the device. The imposition operation may include operations for defining a placement of one or more pages on a number of sheets, such as selecting an orientation of the page, and sequencing the one or more pages. The imposition operation may also include an operation for defining a number of finishing operations. Further, the term "print job" can refer to a file or multiple files submitted to a printing device for printing. The imposing operation may also include one or more stacking operations and operations that define at least one finishing location for one or more finishing operations.

The term "finishing operation" may include operations such as stapling, punching, folding, etc., on various pages of the print job. The terms "jog," "jogging," or "jogging operation" refers to offsetting of stacked output. The result is a variable vertical edge, usually two positions, on the vertical edge of the stack.

The term "Digital Front End" (DFE) can refer to a controller of a printing device such as a digital printing device, a copier, printer, digital copier, etc. The DFE is capable of loading files from multiple sources such as network, for printing on the device. A DFE converts PDL (Page Description Language) files and printing instructions into print engine consumable images and print instructions. The DFE has a display mechanism by which users can define print instructions for jobs. These instructions can cover image quality, finishing, orientation, etc. The DFE, in the process of converting to print engine images, resolves differing sources (e.g., job ticket, queue settings) of job instructions into a single set of instructions. The DFE is also capable of interfacing with a print driver from a networked device or client device interface.

The device or system for facilitating a user to process at least one value of a number of attributes may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

OVERVIEW

Embodiments of the present disclosure relate to methods, devices, systems, computers and computer readable mediums, and graphical user interfaces that can facilitate a user to process at least one value of a number of attributes on a device such as an imaging or a printing device. A graphical user interface (GUI) can have a number of graphical format objects provided on a display device of the device. The graphical format objects correspond to the attributes of the device. The GUI is configurable to allow a user to manipulate the graphical format objects by either selecting or dragging one or more of the graphical format objects of the GUI on the display manager in a click-and-drag or touch-and-drag manner. In the functions and display of the GUI, a graphical representation can be created for the attributes based on the manipulation of the graphical format objects. Further, one or more values of the attributes are defined based on the graphical representation. The graphical representation may be saved along with the one or more values of the attributes. The one or more operations then may be executed or performed on the device based on the saved graphical representation and/or the values of the attributes. In some embodiments, the saved graphical representation and the one or more values of the attributes are exported to a second device or another device for execution. Then the graphical representation and the one or more values may be executed on the second device or the another device for performing at least one operation. The another device is capable of recognizing the saved graphical representation and the values of the one or more attributes.

In an exemplary scenario, when the device is a printing device (or a digital printing device), the display device may display a GUI including graphical format objects corresponding to attributes such as, but not limited to, "numbered pages", "sheets", "finishing operations", "simplex mode", "duplex mode," and so forth, to the user. In the exemplary embodiment, the display device may display a GUI including graphical format objects corresponding to any appropriate attribute for a printing device. The user may first select a graphical representation of an imposition operation such as, selecting a simplex or a duplex graphical sheet (or a series of sheets). The user then may select numbered graphical pages and drag-and-drop the numbered pages on the sheets. The pages can be oriented in any right angle orientation by the user. The orientation can be performed by manipulating the icon for sheet orientation using a finger on a touch screen or a pointing device such as a stylus, using a mouse, or voice commands. The user can then select graphical objects representing finishing operations such as staple, fold, and punch. The user then may "apply" the finishing operation by dragging and dropping the graphical object representing the operation onto one of the appropriate regions on the graphical sheets. For operations such as, "jog", the user can choose a stack orientation for the graphical representation of the sheets. The user then may shift the graphical sheets representing the chosen "jog" operation.

The values/attributes updates are illustrated on the display device as the layout/finishing operations are defined. The user may also apply one or more imposition functions/operations related settings throughout the job (e.g., 2 Up scenario as Duplex) or can set an exception for a particular page in the job. For example, with a 100 page job, the user can choose 2 Up as Duplex for all pages except page number 50, which can be dragged and dropped on the display device to indicate the particular page should be simplex. In an exemplary embodiment, the user can choose to manipulate the attribute values by switching to attribute/value menu to drive outcomes.

Exemplary Embodiments

FIG. 1A is a schematic that illustrates an exemplary system 100A, in accordance with an embodiment of the present disclosure. To analyze the present disclosure, the system 100A can be visualized as having the following primary components, a device 102 including a display device 106A and a user 104. The device 102 can be any suitable digital electronic device, such as, but not limited to, an imaging device 108, a printing device, and so forth as illustrated in a system 100B of FIG. 1B. The imaging device 108 can be a printer, camera, etc., having a display device 106B similar to the display device 106A of FIG. 1A. Hereinafter, the display device 106A and the display device 106B can be referred as display device 106 without changing its meaning or functionality. Examples of the printing device or printer may include a toner-based printer, solid ink printer, liquid inkjet printer, inkless printer, dot matrix printer, dye-sublimation printers, and so forth.

Figure 1B:
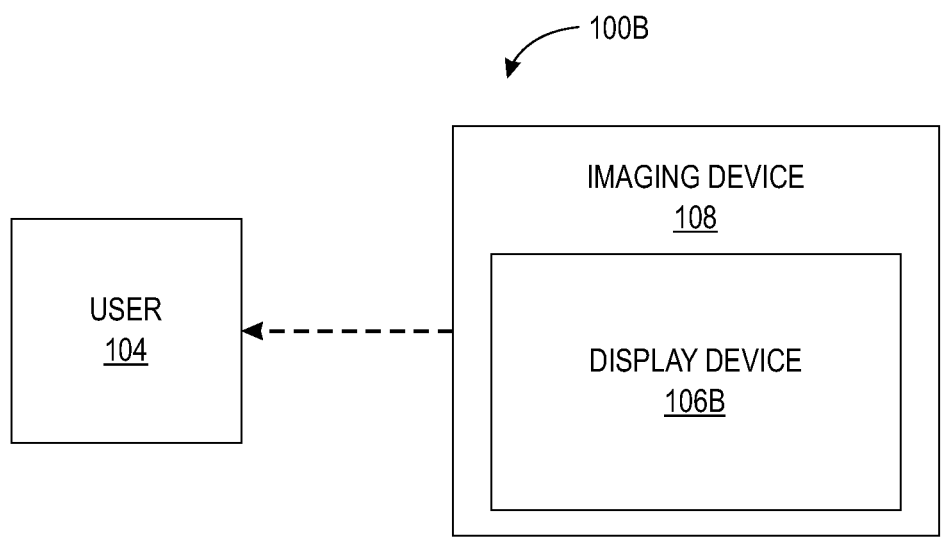
FIG. 1B is a schematic illustrating another exemplary system including an imaging device, in accordance with another embodiment of the present disclosure.

As shown in FIGS. 1A-1B, the display device 106 may be configured to display at least one graphical user interface (GUI) to the user 104. In some embodiments, the display device 106 can display a graphical user interface (GUI) having a number of graphical format objects to the user 104. The GUI provides an interface to the user to interact with the device 102.

The imaging device 108 can include the display device 106B configured to display at least one GUI to the user 104. The GUI provides an interface to the user 104 to interact with the imaging device 108.

In some embodiments, a print driver is associated with the device 102 or the imaging device 108. In an exemplary printing application, the application can have its own set of printing tools and print drivers that are associated with a server or client computer such as computer. The print driver or application will have a graphical user interface associated with it. The exemplary GUI and methods described in the embodiments can be used with a print driver or with other software associated with a printing device such as, but not limited to, print submission software or other appropriate printing software.

In some embodiments, the graphical format objects can correspond to a number of attributes. The attributes may define one or more properties for the device. The graphical format objects may represent number of pages, number of sheets (i.e., simplex, duplex, etc.), and finishing operations. The GUI can allow the user 104 to selectively manipulate the graphical format objects with drag-and-drop operations. The one or more of the graphical format objects may be manipulated by the user 104 to create a graphical representation of the imposition/finishing operation to be applied on a print job. The print job may be a job for printing at least one file on a suitable media such as a paper, a glass, a plastic sheet, cloth, and so forth. Examples of the operation may include, but are not limited to, page placement on sheets including orientation and sequencing, finishing operation like stapling, finishing location like staple location, and stacking operation like jogging.

Figure 2A:
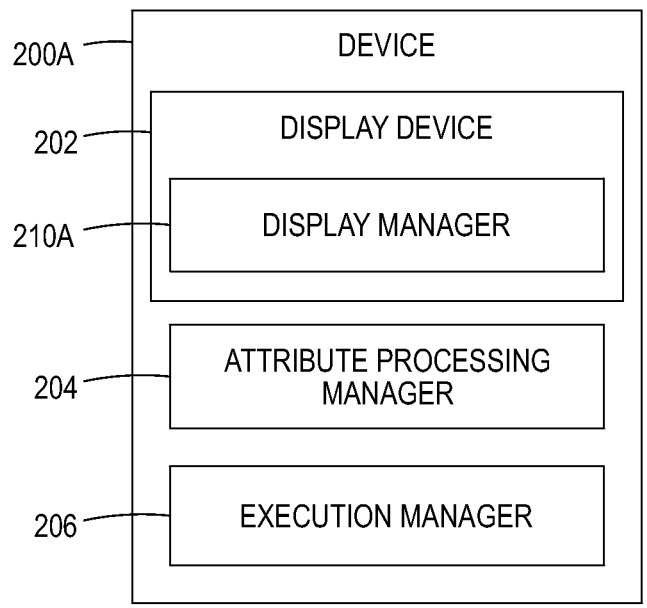
FIG. 2A is a schematic illustrating structural components of an exemplary device of facilitating a user to process a number of attributes, in accordance with an embodiment of the present disclosure.

FIG. 2A is a schematic illustrating structural components of an exemplary device 200A for facilitating a user to process a number of attributes, in accordance with an embodiment of the present disclosure. The device 200A can include a display device 202, an attribute processing manager 204, and an execution manager 206. The display device 202 includes a display manager 210A configured to display a graphical user interface (GUI) at the display device 202. The GUI may include a number of graphical format objects such that each of the graphical format objects correspond to at least one of a number of attributes. The GUI allows the user 104 to manipulate the graphical format objects. In some embodiments, the user 104 manipulates the graphical format objects by touching one or more of the graphical objects using his/her finger and dragging the graphical format object on the GUI. However, the embodiments intend to include, and otherwise cover, any appropriate method of moving graphical format objects including using a pointing device such as a stylus, using a mouse, or voice commands. The graphical format objects may represent at least one of a page selection, at least one sheet mode, and the one or more finishing operations. The sheet mode may include a simplex mode and a duplex mode.

In some embodiments, the GUI allows the user 104 to manipulate the graphical format objects for at least one page of a job. In alternative embodiments, the GUI allows the user 104 to manipulate more than one page of multiple pages of a job. The job may be a print job that can be executed on the device 200A or 200B. In some embodiments, the user 104 manipulates the graphical format objects, or alternatively text shown on the GUI, to create a graphical representation of the operations, such as imposition or finishing operations, which may be applied while executing a job such as a printing job on the device 104 or another device.

The attribute processing manager 204 can be configured to create a graphical representation for the attributes based on the manipulation of the graphical format objects by the user 104. The attribute processing manager 204 can also be configured to define one or more values of the attributes based on the graphical representation. The attribute processing manager 204 may also save the graphical representation and the one or more values of the attributes in a memory (not shown). The memory may be inbuilt within the device 200A or may be an external memory accessible by the device 200A. In some embodiments, the graphical representation is saved using a pre-defined format such as, but not limited to, a Xerox Print Interface (XPIF) format using Common Print Semantics Specification (CPSS), Job Description Format (JDF), and DFE internal job/queue attribute value format. In some embodiments, the attribute processing manager 204 is further configured to selectively save the graphical representation and the one or more value for the attributes for one or more of the pages of the job. The job may be a print job for printing one or more files including one or more pages onto a media such as, but not limiting to, a paper, glass, a cloth, a plastic sheet, and so forth.

Further, the execution manager 206 of the device 200 is configured to execute one or more operations on the device 200 based on the saved graphical representation. The one or more operations may include at least one operation for defining a placement of one or more pages on a number of sheets including selecting an orientation of the page, and sequencing the one or more pages. The operations may also include a number of finishing operations and/or stacking operations. Examples of the finishing operations may include, but are not limited to, stapling, punching, folding, and so forth. Example of the stacking operation may include, but not limited to, jogging, and so forth. The operations may also include operation for defining at least one finishing location for at least one of the finishing operations.

In some embodiments, the execution manager 206 is also configured to export the saved graphical representation for use by another device or additional devices. In an embodiment, the saved graphical representation is exported from a first device (or device) to a second device (another device). The another device can be any suitable electronic device that is capable of receiving, recognizing, and executing upon the saved graphical representation. In an exemplary embodiment, additional devices may include, but are not limited to, printers, imaging devices, photocopiers, xerographic photocopiers, paper handlers, document finishers, scanners, printers, a fax machine, or any appropriate imaging or printing device. Further, a second execution manager (not shown) on the another device can be configured to execute the exported graphical representation on the another device. The second execution manager may be similar in functionality to the execution manager 206.

Figure 2B:
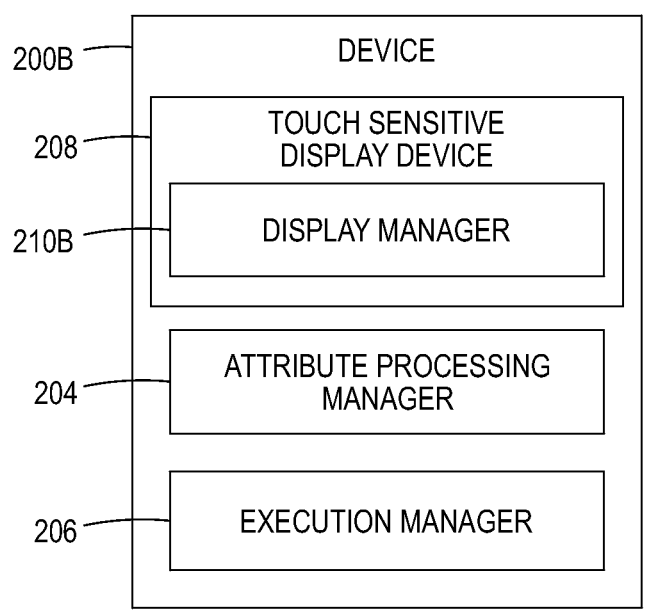
FIG. 2B is a schematic illustrating structural components of another exemplary device, in accordance with another embodiment of the present disclosure.

In an exemplary embodiment illustrated in FIG. 2B, a display manager 210B manages a touch sensitive display device 208 of the device 200B. The user can manipulate or select one or more graphical format objects by touching and dragging the graphical format objects on the touch sensitive display device 208 using his/her finger, thumb, or a pointing device such as a stylus, using a mouse, or voice commands.

Figure 3:
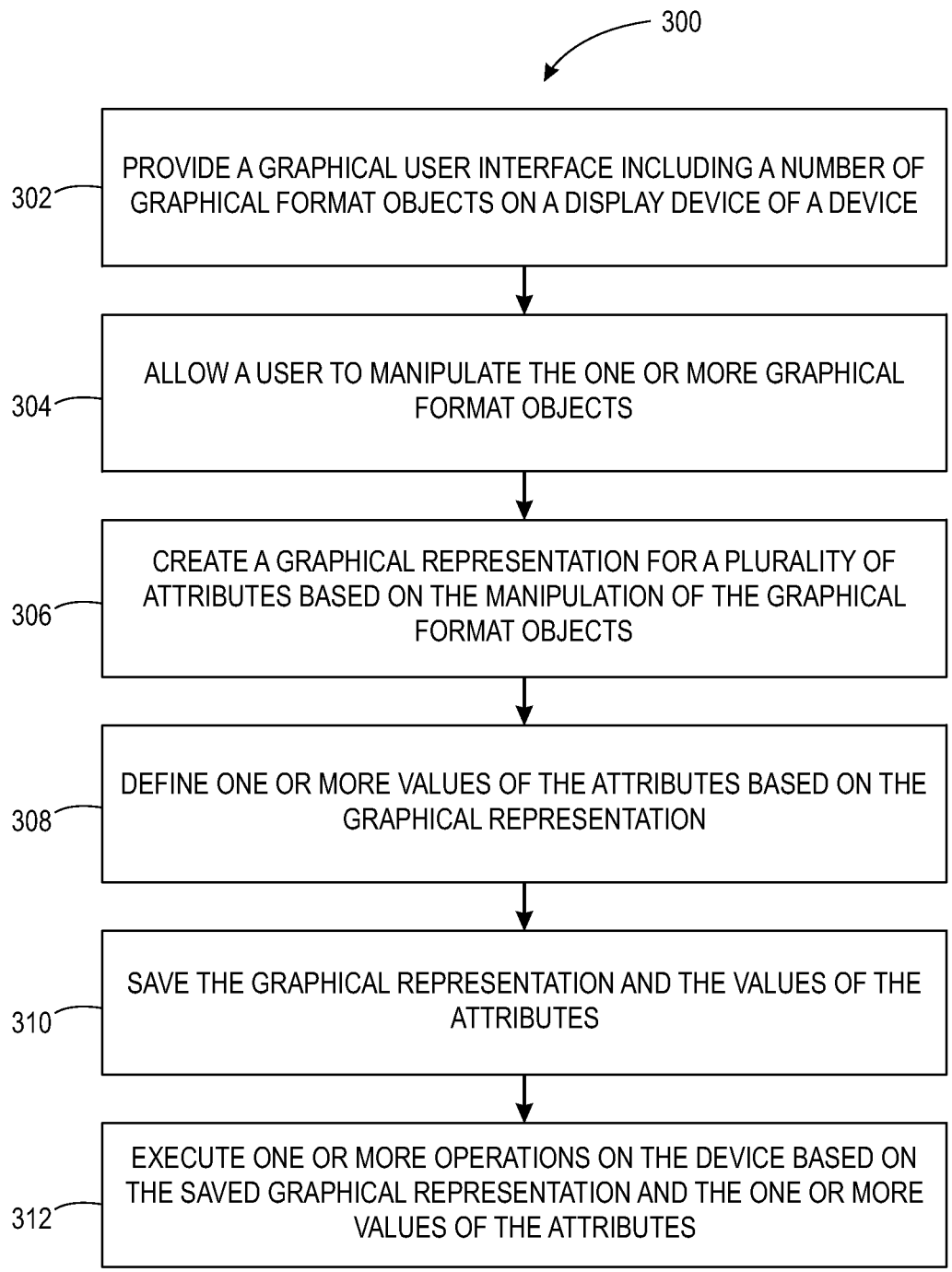
FIG. 3 is a flowchart illustrating a method for facilitating a user to process at least one value of a plurality of attributes on the device of FIG. 2A, in accordance with an embodiment of the present disclosure.

FIG. 3 is a flowchart illustrating an exemplary method 300 for facilitating a user to process at least one value of a plurality of attributes on the GUI and execute one or more operations on a device such as the device 102, in accordance with an embodiment of the present disclosure. As discussed with reference to FIGS. 1A, 1B, 2A and 2B, the user 104 can interact with the device 102 (200A-B) via a GUI. The GUI includes a number of graphical format objects corresponding to one or more attributes of the device 102.

At step 302, a graphical user interface (GUI) is provided to the user 104 on the display device 202 (or touch sensitive display device 208) of the device 102 (or 200A-B). The display device 202 may be the touch sensitive display device 208. In some embodiments, the display manager 210A (or 210B) displays the GUI on the display device 202. The graphical user interface (GUI) may include a number of graphical format objects. Each of the graphical format objects is associated with at least one of the attributes of the device 102. In some embodiments, the graphical format objects represent at least one of a page selection, at least one sheet mode, and the one or more finishing operations. The sheet mode may be a simplex mode and a duplex mode.

Further, the user 104 is capable of manipulating the graphical format objects. At step 304, the user 104 is allowed to manipulate the graphical format objects by selecting and/or dragging one or more of the graphical format objects of the GUI. In some embodiments, the GUI is configured to allow the user 104 to manipulate the graphical format objects for only one page of a job. The job can be a printing job that can be executed on the device 102. In alternate embodiments, the GUI allows the user 104 to manipulate the graphical format objects for one or more of the pages of a job.

At step 306, a graphical representation for the attributes is created based on the manipulation of the graphical format objects. In some embodiments, the attribute processing manager 204 creates the graphical representation for the attributes based on the manipulation of the graphical format objects. The user 104 may manipulate the graphical format objects. As the user 104 manipulates the graphical format objects, a graphical representation based on the manipulation and is displayed to the user 104 on the displayed device 106 by the display manager 210A (or 210B). The graphical representation can provide a mimic visualization or view to the user 104 of a final printed output of the job.

The method continues at step 308, where one or more values of the attributes are defined based on the graphical representation. In some embodiments, the attribute processing manager 204 defines the values of the attributes based on the graphical representation. Hence, by merely moving the graphical format objects (icons), the user 104 can set the values for the attributes of the device 102 for a particular job. This is advantageous in that while setting up a print job using the GUI, the user 104 can avoid a requirement to manually record and recall exact values for a particular setting of any particular attribute. This feature can beneficially save time for the user 104 and provide ease of use of the devices of the embodiments, especially when selecting and executing attributes for large print jobs.

At step 310, the graphical representation and the values of the attributes are saved at the device 102. In some embodiments, the attribute processing manager 204 saves the graphical representation and the values of the attributes in a memory of the device 102. Further, the attribute processing manager 204 may selectively save the graphical representation and the one or more values for the attributes for one or more pages of a job (or a print job). Further, the graphical representation may be saved as a queue or as combination of job attributes/values using a pre-defined format. Examples of the pre-defined format may include, such as, but are not limited to, a Xerox Print Interface (XPIF) format using Common Print Semantics Specification (CPSS), Job Description Format (JDF), and DFE internal job/queue attribute value format.

Thereafter, at step 312, one or more operations are executed or performed on the device 102 based on the saved graphical representation and the one or more values of the attributes. The one or more operations can be the operations defining a placement of one or more pages on a number of sheets including selecting an orientation of the page, and sequencing the one or more pages. Further, the operations may include a number of finishing operations, stacking operations, and one or more operations for defining at least one finishing location for the finishing operations. The finishing operations can include stapling, punching, folding, etc. The stacking operation can include a jogging operation. In some embodiments, the execution manager 206 is configured to execute the operations on the device 102 based on the saved graphical representation and the values of the attributes. For example, if the user selected a duplex mode, and a stapling operation for the print job, then the pages of the print job are printed in duplex mode, i.e., two pages on one sheet of paper (or media) and the device 102 staples thereafter the printed pages. Further, the GUI can allow the user 104 to have a mimic view or visualization of the final output before actual execution of the operations on the job. Here, the final output can mimic a view of the sheets showing placement of pages on each sheet.

Figure 4:
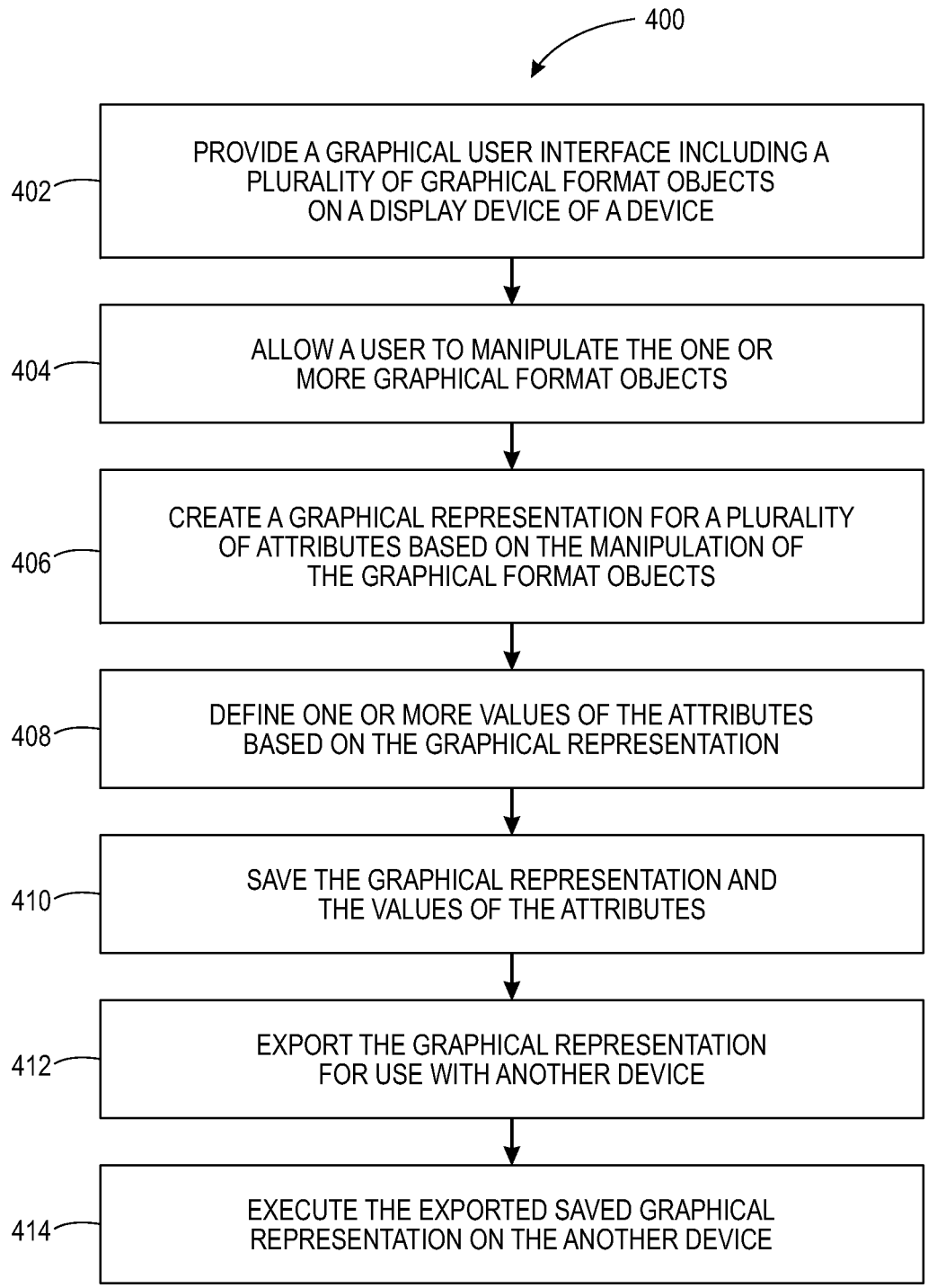
FIG. 4 is a flowchart illustrating a method for facilitating a user to process at least one value of a plurality of attributes on a device, in accordance with another embodiment of the present disclosure.

FIG. 4 is a flowchart illustrating an exemplary method for facilitating the user 104 to manipulate the graphical format objects on the GUI of the device 102, in accordance with another embodiment of the present disclosure. As discussed with reference to FIGS. 1A, 2A, and 2B, the user 104 may interact with the device 102 (200A or 200B) having the display manager 210 for controlling or managing the display device 106 (202A or 208). In some embodiments, the display device 106 may be a digital front end (DFE). The (DFE) can be a controller of a printing device such as a digital printing device, a copier, printer, digital copier, etc. The DFE is capable of loading files from multiple sources such as network, for printing on the device. A DFE may convert PDL (Page Description Language) files and printing instructions into print engine consumable images and print instructions. The DFE may include a display mechanism by which users can define print instructions for jobs. These instructions can cover image quality, finishing, orientation, etc. The DFE, in the process of converting to print engine images, resolves differing sources (e.g., job ticket, queue settings) of job instructions into a single set of instructions. The DFE is also capable of interfacing with a print driver from a networked device or client device interface.

The display manager 210A-210B may display a GUI including multiple graphical format objects corresponding to one or more attributes of the device 102. In some embodiments, the GUI also includes one or more objects shown as text corresponding to at least one attribute of the device 102. In some embodiments, the graphical format objects can include, but are not limited to, at least one of a page selection, a sheet mode, and the one or more finishing operations. The sheet mode can be one of a simplex mode and a duplex mode. The user 104 can select and/or drag one or more graphical format objects and/or the textual selection objects. In an exemplary embodiment, the graphical format objects include, but are not limited to, pages, sheets, finishing operations, etc.

At step 402, a GUI is provided to the user 104 by display manager 210 on a display device 106 of a first device such as the device 102 (or 200A-B). The display device 202 may alternatively be a touch sensitive display device 208. The display manager 210 may display the GUI on the display device 202 (or 208).

In the exemplary method, the user 104 is allowed to manipulate the graphical format objects on the GUI for changing or setting one or more values of the attributes of the device 102 for a particular job execution on the first device 106 or any other suitable device. The job may be a print job for printing one or more pages on one or more media such as paper sheets. At step 404, the user 104 manipulates the graphical format objects by selecting and/or dragging one or more of the graphical format objects of the GUI by any suitable method. In some embodiments, the user 104 may manipulate the graphical format objects by touching one or more graphical format objects and then moving or dragging the one or more graphical format objects on the GUI using his or her finger or any suitable pointing device such as a stylus, using a mouse, or voice commands. The user 104 can manipulate the graphical format objects and/or the textual selection objects, thereby forming a graphical representation of the intended operations such as imposition or finishing operations that may be applied while executing a job such as a printing job on the device 104 or alternatively on a networked another device. In some embodiments, the GUI allows the user 104 to manipulate the graphical format objects selectively for one of the pages of a job. The job can be a printing job that can be executed on the exemplary device or any other similar device. In alternate embodiments, the GUI allows the user to selectively manipulate the graphical format objects for multiple pages of a job.

Next, at step 406, a graphical representation for the attributes is created based on the manipulation of the graphical format objects. In some embodiments, the attribute processing manager 204 creates the graphical representation for the attributes based on the manipulation of the graphical format objects. As the user 104 manipulates the graphical format objects, the display manager 210 on the display device 106 displays a graphical representation based on the manipulation to the user 104. The graphical representation can provide a mimic visualization or view to the user 104 of a final printed output of the job.

Then at step 408, one or more values of the attributes can be defined based on the graphical representation. In some embodiments, the attribute processing manager 204 defines the values of the attributes based on the graphical representation. Hence, by moving the graphical format objects (or icons or images) the user 104 can set the values for the attributes of the first device for a particular job, and the user 104 is not required to remember the exact values for a particular setting of an attribute. This feature can beneficially save time for the user 104 and provide ease of use of the devices of the disclosed embodiments, especially when selecting and executing attributes for large print jobs.

At step 410, the graphical representation and the values of the attributes are saved at the device 102. In some embodiments, the attribute processing manager 204 saves the graphical representation and the values of the attributes at the device 102 in a memory associated with the device 106. Further, the attribute processing manager 204 may selectively save the graphical representation and the one or more value for the attributes only for some of the pages of a job (or a print job). Further, the graphical representation may be saved as a queue or as combination of job attributes/values using a pre-defined format on the first device. Examples of the pre-defined format may include, such as, but are not limited to, a Xerox Print Interface (XPIF) format using Common Print Semantics Specification (CPSS), a Job Description Format (JDF), and a Digital Front End (DFE) internal job/queue attribute value format.

At step 412, the graphical representation is exported for use with another device. The another device is configured to recognize and execute the saved graphical representation. The saved graphical representation includes settings for the one or more attributes for execution of the one or more operations. The additional device can be any suitable device, which is compatible with the device 102. Thereafter, at step 414, one or more operations are executed and performed on a print job that may be executed on the another device based on the exported graphical representation and/or the one or more values of the attributes. Further, the one or more operations can include, but are not limited to, operation(s) defining a placement of one or more pages on a number of sheets including selecting an orientation of the page, and sequencing the one or more pages. Further, the operation may include finishing operations, stacking operations, and one or more operations for defining at least one finishing location for the finishing operations. The finishing operations may be stapling, punching, folding, etc. The stacking operation may be a jogging operation on the pages of the print job. In some embodiments, the another device includes a second execution manager similar to the execution manager 206 to execute the operations on the another device based on the saved graphical representation and the values of the attributes. For example, if the user selects a duplex mode and stapling operation for the print job, then the pages of the print job are printed in duplex mode i.e. two pages on one sheet of paper (or media) and then the printed pages can be stapled second or additional device.

Figure 5A:
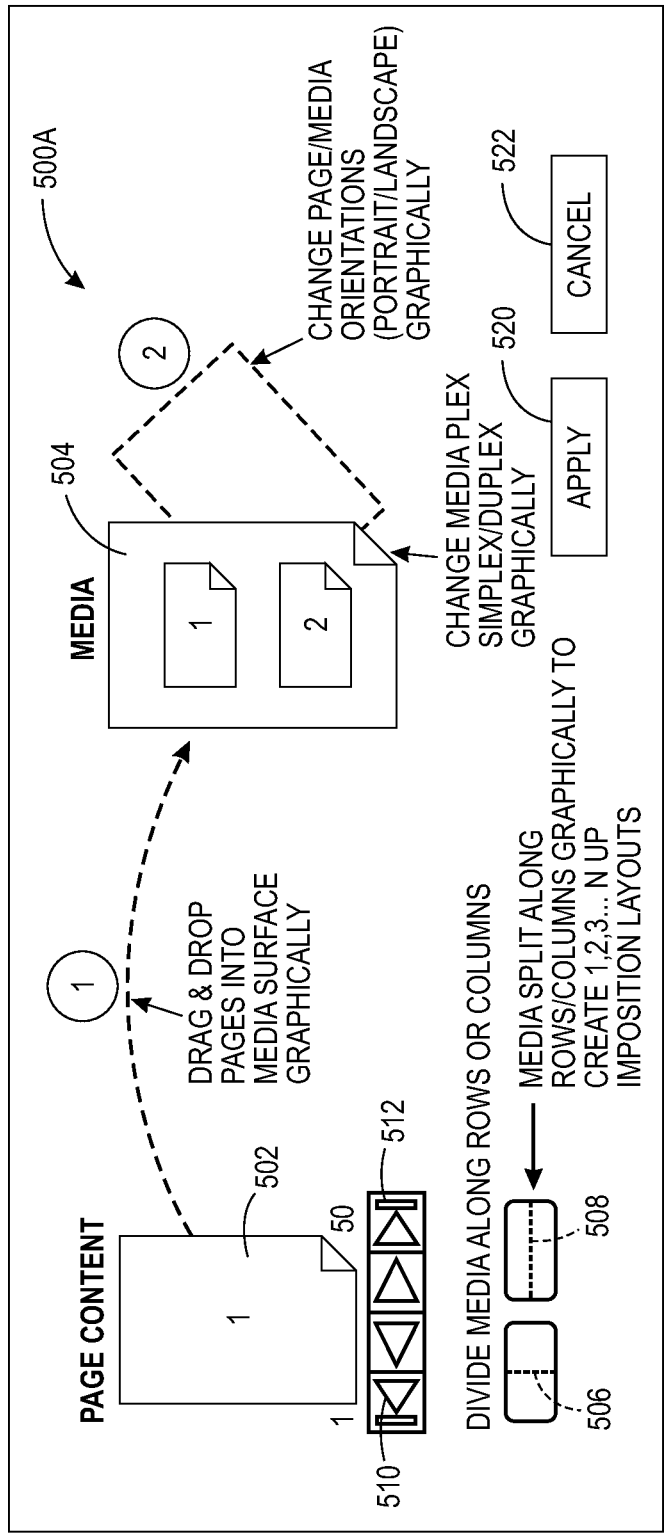
FIG. 5A depicts an exemplary graphical user interface and method for manipulating one or graphical format objects, in accordance with an embodiment of the present disclosure.

FIG. 5A depicts an exemplary graphical user interface 500A and method for manipulating one or graphical format objects, in accordance with an embodiment of the present disclosure. As discussed with reference to FIG. 1A, the user 104 can select, drag and drop, and/or manipulate the one or more of the graphical format objects such as graphical format objects 502A-512D on the GUI 500A for setting or modifying values of attribute(s) of the device 102. The device 102 can include, but is not limited to, an imaging device or a printing device configured to execute a job such as a print job. The print job may include printing of one or more files or pages of a file on a media. The media can include paper, plastic, glass, or any appropriate printing media.

The graphical format object 502 (pages 502) represent one or more pages of a print job that need to be executed on the device 102. The graphical format object 504 represents the media for printing. The graphical format object 504 or a media 504 allows the user 104 to selectively modify an orientation of the media for execution of the print job. Further, the graphical format object 506 or the split along row object 506 allows the user 104 to place one or pages 502 of the print job along the rows. The graphical format object 508 or split along column object 508 allows the user 104 to place the pages 502 of the print job along the columns for manipulating the attributes. The split along column object 508 allows the user 104 to split the media 504 along rows graphically to create 1Up, 2Up, etc. imposition layouts.

As shown by "step 1", the user 104 can drag and drop one or more pages of the print job using the graphical format object 502 on the graphical format object 504 corresponding to the media 504. Further, at "step 2", the user 104 can modify the orientation of the pages on the graphical format object (for media) 504 from portrait to landscape orientation. As shown, each page 502 is dragged as landscape on the media 504. The user 104 may also selectively modify an attribute of a print job between a duplex and a simplex mode by touching or selecting the media 504.

Further, the GUI 500A includes a number of options in form of a tab 510-512. The tab 510-512 may allow the user 104 to move between various menus, for example higher and lower menu levels, or backwards and forwards menu levels within the GUI 500 while selecting the values of the attributes on the device 102.

Figure 5B:
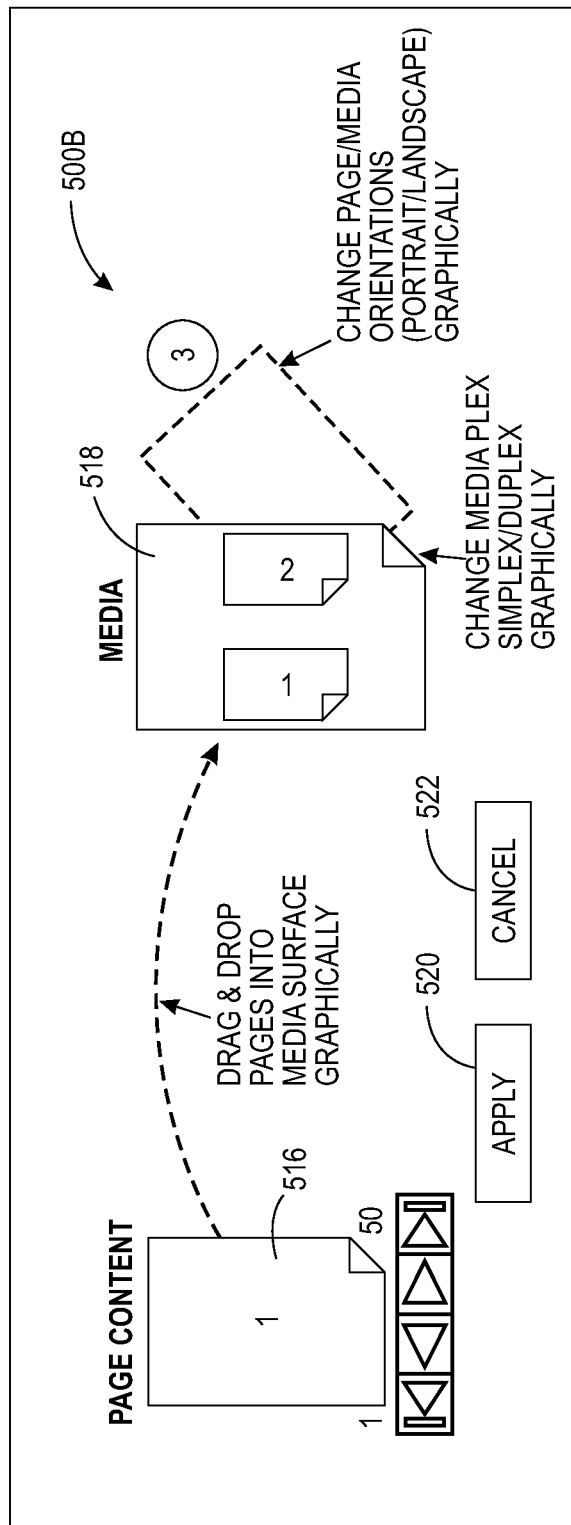
FIG. 5B depicts an exemplary graphical user interface and method for manipulating one or graphical format objects, in accordance with another embodiment of the present disclosure.

FIG. 5B depicts an exemplary graphical user interface 500B and method for manipulating one or graphical format objects, in accordance with another embodiment of the present disclosure. In an exemplary scenario as shown, at "step 3", the user 104 can change the orientation of the pages on the graphical format object 504 from a landscape to a portrait orientation. The GUI 500A-500B also includes options such as an Apply option 520 and a Cancel option 522. The user 104 can apply and save the manipulated graphical format objects 502-512 by selecting the Apply option 520. Further, the user 104 can cancel the manipulated graphical format objects 502-512 by selecting the Cancel option 522. The user 104 can graphically drag and drop one or more of the graphical format objects 502-512.

Figure 6:
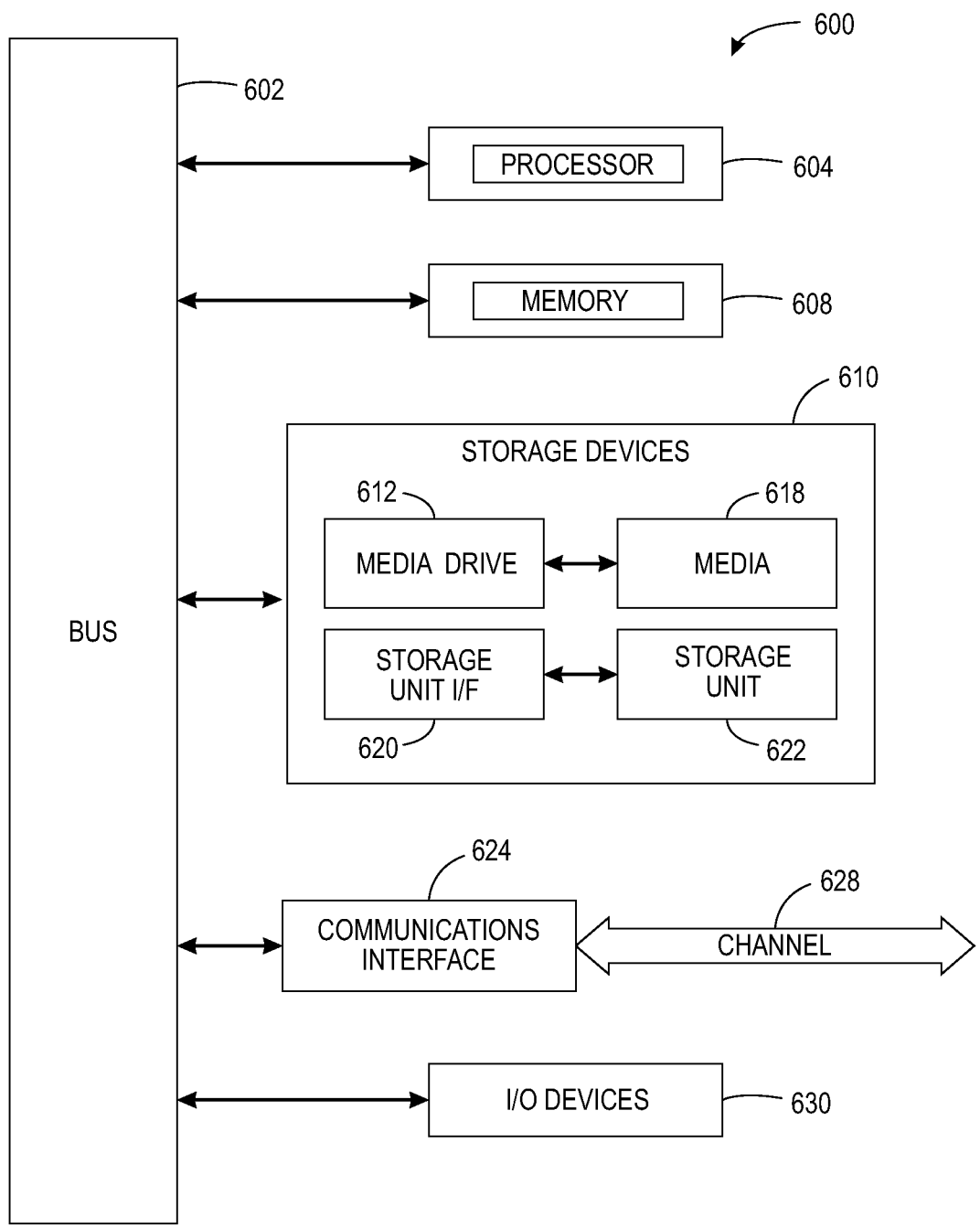
FIG. 6 is a schematic illustrating a functional block diagram of a device and system on a network in which the present disclosure can find application.

FIG. 6 illustrates a functional block diagram of a device and system on a network in which the present disclosure can find application. FIG. 6 further illustrates an exemplary computing system or a networked document-services system 600 such as those described in FIGS. 1A, 1B, 2A, and 2B that may be employed to implement processing functionality for various embodiments of the disclosed subject matter. For example, the computing system 600 is configured to facilitate a user to process at least one value of a plurality of attributes via a graphical user interface in accordance with the techniques described above. The computing system 600 may represent, for example, a user device such as a printing device, and imaging device, a personal computer, a server, a scanner, shared memories, multi-function device, controllers for such devices or any other type of special or general purpose computing device as may be desirable or appropriate for a given application or environment. A printing device can include a digital copier, a printer, a 3D printing device, plotting device, etc. In some embodiments, a print driver is associated with a printing device, or a special printing application having its own set of printing tools is associated with a computer. The print driver or application will have a graphical user interface (GUI) associated with it. The GUI and techniques described above in FIGS. 3 and 4 can be used with a print driver or with other software associated with a printing device, such as, for example, print submission software.

The computing system 600 can include one or more processors, such as a processor 604. The processor 604 can be implemented using a general or special purpose processing engine such as, for example, a microprocessor, microcontroller or other control logic. In this example, the processor 604 is connected to a data pathway (e.g., buses, Ethernet) 602 or other communication medium. Although only one processor 604 is shown, in certain embodiments, the computing system may include more processors in an expanded or distributed design.

The computing system 600 can also include a main memory 606, preferably random access memory (RAM) or other dynamic memory, for storing information and instructions to be executed by the processor 604. The processor 604 accepts instructions and data from the memory 606 and performs various data processing functions of the system. These data processing functions may include, but are not limited to, providing graphical format objects via a graphical user interface, creating a graphical representation for a plurality of attributes, defining values of attributes based on selection of the graphical representation, executing operation on the computing system based on graphical representation and values of attributes, and so forth. The processor 604 includes an arithmetic logic unit (ALU) that performs arithmetic and logical operations, and a control unit that extracts instructions from the memory 606 and decodes and executes them, calling on the ALU when necessary. The main memory 606 also may be used for storing temporary variables or other intermediate information during execution of instructions to be executed by the processor 604. The memory 606 stores a variety of data received by the system 600 and computed by the various data processing functions of the system 600. The data may include, for example, values of attributes, graphical format objects, graphical representations, and so forth.

The computing system 600 may likewise include a read only memory ("ROM") or other static storage device coupled to the data pathway 602 for storing static information and instructions for processor 604. Also, the memory 606 preferably contains an operating system, which executes on the processor 604. The operating system performs basic tasks that include recognizing input, sending output to output devices, keeping track of files and directories and controlling various peripheral devices.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. A storage media 616 may include, for example, a hard disk, floppy disk, magnetic tape, optical disk, CD or DVD, or other fixed or removable medium that is read by and written to by media drive 612. As these examples illustrate, storage media 616 may include a computer-readable storage medium having stored there in particular computer software or data.

In alternative embodiments, information storage mechanism 610 may include other similar instrumentalities for allowing computer programs or other instructions or data to be loaded into the computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and the interfaces 620 that allow software and data to be transferred from removable the storage unit 622 to the computing system 600.

The computing system 600 can also include a communications interface 624 that enables the computing system 600 to access other computers and resources on a communication network. The communications interface 624 can be used to allow software and data to be transferred between computing system 600 and external devices. Examples of the communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 626. This channel 626 may carry signals and may be implemented using a wireless medium, wire or cable, fiber optics, or other communications medium. Some examples of a channel include a phone line, a cellular phone link, an RF link, a network interface, a local or wide area network, and other communications channels. What is important is that the various computers and peripherals can interact to perform various document services.

The computing system 600 further includes input/output devices 628 such as a keyboard and a mouse that enables a user to enter data and instructions into the computing system 600, a display device that enables the user to view the available information, and a printer that enables the user to print any data for his reference. Alternatively, input/output devices 628 may include a touch sensitive display that enables a user to enter data and instructions into the computing system 600 as well as to view the available information.

In this document, the terms "computer program product" and "computer-readable medium" may be used generally to refer to media such as, for example, the memory 606, the storage device 616, the storage unit 622, or signal(s) on the channel 626. These and other forms of computer-readable media may be involved in providing one or more sequences of one or more instructions to the processor 604 for execution. Such instructions, generally referred to as "computer program code" (which may be grouped in the form of computer programs or other groupings), when executed, enable computing system 600 to perform features or functions of embodiments of the disclosed subject matter.

In an embodiment where the elements are implemented using software, the software may be stored in a computer-readable medium and loaded into the computing system 600 using, for example, removable storage drive 614, the drive 612 or the communications interface 624. The control logic (in this example, software instructions or computer program code), when executed by processor 604, causes processor 604 to perform the functions of the disclosed subject matter as described herein.

An aspect of the present disclosure allows the user to selectively manipulate the graphical format objects for one or more pages of the print job for execution on a device such as a printing device.

Another aspect of the present disclosure allows the user to selectively save the graphical representation and one or more values of the attributes for one or more pages of the job (or print job).

It will be understood that the managers and the databases referred to in the previous sections are not necessarily utilized together method or system of the embodiments. Rather, these managers are merely exemplary of the various managers that may be implemented within a device (imaging device or printing device), and can be implemented in exemplary another devices, and other devices as appropriate, that can communicate via a network to the exemplary imaging and printing devices.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for facilitating processing of at least one value of a plurality of attributes on a device, comprising:
   providing, by a display manager, a graphical user interface (GUI) on a display device associated with the device, wherein the GUI includes a plurality of graphical format objects corresponding to each of the plurality of attributes;
   allowing, by the GUI, a user to manipulate the plurality of graphical format objects by at least one of selecting and moving one or more of the plurality of graphical format objects of the GUI;
   creating, at an attribute processing manager, a graphical representation for the plurality of attributes based on the manipulation of the plurality of graphical format objects by the user;

defining, at an attribute processing manager, one or more values of the plurality of attributes based on the graphical representation; and saving, at an attribute processing manager, the graphical representation and the one or more values of the plurality of attributes, wherein one or more operations are executed, by an execution manager, on the device based on the saved graphical representation and the one or more values of the plurality of attributes.

2. The method of claim 1, wherein the device is an imaging device and the display device is a Digital Front End (DFE) of the imaging device.

3. The method of claim 2, wherein the display of the device comprises a touch sensitive interface.

4. The method of claim 3, wherein the user manipulates the plurality of graphical format objects by touching and dragging the one or more of the plurality of graphical format objects on the GUI.

5. The method of claim 4, wherein the user manipulates the plurality of graphical object graphical format objects by using at least one of a pointing device, a stylus, a mouse, or one or more voice commands.

6. The method of claim 5, wherein the one or more operations comprise at least one of one or more imposition operations and one or more finishing operations.

7. The method of claim 6, wherein the one or more operations comprise at least one operation for:

defining a placement of one or more pages on a plurality of sheets including selecting an orientation of the one or more pages, and sequencing the one or more pages;

defining a plurality of finishing operations;

defining at least one finishing location for at least one of the plurality of finishing operations; and defining one or more stacking operations.

8. The method of claim 7, wherein the plurality of graphical format objects represents at least one of a page selection, at least one sheet mode, and the one or more finishing operations, wherein the sheet mode comprises a simplex mode and a duplex mode.

9. The method of claim 8, further comprising:

allowing, by the GUI, the user to manipulate the graphical format objects for at least one of the plurality of pages of a job.

10. The method of claim 9, further comprising:

selectively saving, at the attribute processing manager, the graphical representation for the plurality of attributes and the one or more values for the plurality of attributes for one or more of the plurality of pages of the job to a memory.

11. The method of claim 10, wherein the job is a print job that needs to be executed on the imaging device, the imaging device comprising a printing device.

12. The method of claim 11, wherein the graphical representation for the plurality of attributes is saved to the memory using a pre-defined format.

13. The method of claim 12, wherein the pre-defined format comprises at least one of a Xerox Print Interface (XPIF) format using Common Print Semantics Specification (CPSS), Job Description Format (JDF), and DFE internal job/queue attribute value format.

14. The method of claim 13, further comprising:

exporting, by the execution manager, the saved graphical representation for the plurality of attributes and the one or more values of the plurality of attributes to another device that is capable of recognizing the saved graphical representation; and executing, by a second execution manager on the another device, operations associated with the exported graphical representation.

15. A system for facilitating processing of at least one value of a plurality of attributes on a device, comprising:

a display manager configured to display a graphical user interface including a plurality of graphical format objects on a display device associated with the device, the plurality of graphical format objects are corresponding to each of the plurality of attributes, wherein the GUI allows a user to manipulate the plurality of graphical format objects;

an attribute processing manager configured to:

create a graphical representation for the plurality of attributes based on the manipulation of the plurality of graphical format objects by the user;

define one or more values of the plurality of attributes based on the graphical representation; and save the graphical representation and the one or more values of the plurality of attributes; and an execution manager configured to execute one or more operations on the device based on the saved graphical representation and the one or more values of the plurality of attributes.

16. The system of claim 15, wherein the device comprises an imaging device, and the display device comprises a Digital Front End (DFE) of the imaging device.

17. The system of claim 16, wherein the display device comprises a touch sensitive interface.

18. The system of claim 17, wherein the user manipulates the plurality of graphical format objects by touching and dragging the one or more of the plurality of graphical format objects on the display device.

19. The system of claim 18, wherein the user manipulates the plurality of graphical format objects by using at least one of a pointing device, a stylus, a mouse, or one or more voice commands.

20. The system of claim 19, wherein the one or more operations comprise at least one of one or more imposition operations and one or more finishing operations.

21. The system of claim 20, wherein the one or more operations comprise at least one operation for:

defining a placement of one or more pages on a plurality of sheets including selecting an orientation of the one or more pages, and sequencing the one or more pages;

defining a plurality of finishing operations;

defining at least one finishing location for at least one of the plurality of finishing operations; and defining one or more stacking operations.

22. The system of claim 21, wherein the plurality of graphical format objects represent at least one of page selection, at least one sheet mode, and the one or more finishing operations, wherein the sheet mode comprises a simplex mode and a duplex mode.

23. The system of claim 22, wherein the GUI allows the user to manipulate the graphical format objects for at least one of the plurality of pages and one or more of the plurality of pages of a job.

24. The system of claim 23, wherein the attribute processing manager is further configured to selectively save the graphical representation for the plurality of attributes and the one or more values for the plurality of attributes for one or more of the plurality of pages of the job in a memory.

25. The system of claim 24, wherein the job is a print job that needs to be executed on the imaging device, the imaging device comprises a printing device.

26. The system of claim 25, wherein the graphical representation is saved using a pre-defined format, wherein the pre-defined format comprises at least one of a Xerox Print Interface (XPIF) format using Common Print Semantics Specification (CPSS), Job Description Format (JDF), and DFE internal job/queue attribute value format.

27. The system of claim 26, wherein the execution manager is further configured to:
export the saved graphical representation for the plurality of attributes for use with another device capable of recognizing the saved graphical representation, wherein a second execution manager executes the exported saved graphical representation on the another device.

28. A method for facilitating a user to process at least one value of a plurality of attributes on an imaging device, comprising:
providing, by a display manager, a graphical user interface (GUI) on a touch sensitive display device, the GUI including a plurality of graphical format objects corresponding to the plurality of attributes;
allowing, by the GUI, a user to manipulate the plurality of graphical format objects by dragging one or more of the plurality of graphical format objects of the GUI;
creating, by an attribute processing manager, a graphical representation for the plurality of attributes based on the manipulation of the plurality of graphical format objects by the user;
defining, by the attribute processing manager, one or more values for the plurality of attributes based on the graphical representation; and
saving, by the attribute processing manager, the graphical representation and the one or more values of the plurality of attributes, wherein one or more operations are executed on a job based on the created and saved graphical representation and the one or more values of the plurality of attributes, the one or more operations include at least one of one or more imposition operations and one or more finishing operations.

29. The method of claim 28, further comprising:
selectively saving, by the attribute processing manager, the graphical representation for the plurality of attributes and the one or more values for the plurality of attributes for one or more of the plurality of pages of the job.

30. The method of claim 29, further comprising:
exporting, by the execution manager, the saved graphical representation for the plurality of attributes for use with another device being capable of recognizing the saved graphical representation; and
executing, by a second execution manager, operations associated with the exported graphical representation on the another device.

31. A system for facilitating a user to process at least one value of a plurality of attributes on a digital imaging device, comprising:
a touch sensitive display device comprising a display manager configured to display a graphical user interface (GUI) including a plurality of graphical format objects, the plurality of graphical format objects are corresponding to each of the plurality of attributes, wherein the GUI allows a user to manipulate the plurality of graphical format objects by dragging one or more of the plurality of graphical format objects;
an attribute processing manager configured to:
create a graphical representation for the plurality of attributes based on the manipulation of the plurality of graphical format objects by the user;
define one or more values for the plurality of attributes based on the graphical representation; and
save the graphical representation and the one or more values of the plurality of attributes; and
an execution manager configured to:
execute one or more operations on a job based on the saved graphical representation and the one or more values of the plurality of attributes, the one or more operations include at least one of one or more imposition operations and one or more finishing operations;
export the saved graphical representation for use with another device capable of recognizing the saved graphical representation; and
execute the exported graphical representation on the another device.

32. The system of claim 31, wherein the attribute processing manager is further configured to selectively save the graphical representation for the plurality of attributes and the one or more values for the plurality of attributes for one or more of the plurality of pages of the job.

33. A computer selecting at least one value of plurality of attributes on a printing device, comprising:
a computer readable medium; and
computer program instructions, recorded on the computer readable medium, executable by a processor, for performing the steps of:
providing a graphical user interface (GUI), by a display manager, including a plurality of graphical format objects, the plurality of graphical format objects are corresponding to each of the plurality of attributes;
manipulating the plurality of graphical format objects by at least one of selecting and moving one or more of the plurality of graphical format objects of the GUI;
creating a graphical representation for the plurality of attributes based on the manipulating of the plurality of graphical format objects;
defining one or more values of the plurality of attributes based on the graphical representation; and
executing an operation on the device based on the graphical representation and the one or more values of the plurality of attributes.

34. A graphical user interface (GUI) for display on a device, the GUI comprising:
a plurality of selectable movable graphical format objects corresponding to a plurality of executable attributes of the device;
rendering a selectable graphical representation of output based upon user manipulation of the plurality of selectable movable graphical format objects; and
saving a value for each of the plurality of executable attributes for subsequent execution by the device to generate output upon selecting the selectable graphical,
wherein user manipulation comprises at least one of selecting and moving the plurality of selectable movable graphical format objects.

35. The GUI of claim 34, wherein subsequent execution comprises executing one or more operation on a job based on the saved graphical representation of each of the plurality of executable attributes and the one or more values of the attributes.

36. The GUI of claim 35, wherein the one or more operation includes at least one of one or more imposition operations and one or more finishing operations.

37. The GUI of claim 36, further comprising:
saving the selectable graphical representations for the plurality of executable attributes for subsequent execution by the device to generate output upon selecting the selectable graphical representation of output.

38. The GUI of claim 37, further comprising:
exporting the saved graphical representations for the plurality of executable attributes for use with another device capable of recognizing the saved graphical representation.

* * * * *